(12) United States Patent
Lu et al.

(10) Patent No.: US 12,341,576 B2
(45) Date of Patent: *Jun. 24, 2025

(54) VEHICULAR SECURED COMMUNICATION SYSTEM

(71) Applicant: MAGNA ELECTRONICS INC., Auburn Hills, MI (US)

(72) Inventors: John Lu, Grand Blanc, MI (US); Lawrence Buie, Lake Orion, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/304,389

(22) Filed: Jun. 21, 2021

(65) Prior Publication Data

US 2021/0314032 A1 Oct. 7, 2021

Related U.S. Application Data

(63) Continuation of application No. 16/798,768, filed on Feb. 24, 2020, now Pat. No. 11,043,990, which is a (Continued)

(51) Int. Cl.
 *H04B 7/0413* (2017.01)
 *H04L 9/40* (2022.01)
 (Continued)

(52) U.S. Cl.
 CPC ........... *H04B 7/0413* (2013.01); *H04L 63/00* (2013.01); *H04L 63/0227* (2013.01);
 (Continued)

(58) Field of Classification Search
 CPC ... H04B 7/0413; H04L 63/00; H04L 63/0227; H04L 63/1408; H04L 2012/40215; H04L 2012/40273; H04W 4/40; H04W 84/18
 See application file for complete search history.

(56) References Cited

U.S. PATENT DOCUMENTS 5,550,677 A 8/1996 Schofield et al.
5,670,935 A 9/1997 Schofield et al.
(Continued)

FOREIGN PATENT DOCUMENTS

CN 104680839 A * 6/2015 ............. B60Q 9/008

*Primary Examiner* — Derrick W Ferris
*Assistant Examiner* — Chuong M Nguyen
(74) *Attorney, Agent, or Firm* — HONIGMAN LLP

(57) ABSTRACT

A vehicular secured communication system includes a plurality of electronic control units disposed at a vehicle and interconnected by a communication network of the vehicle. The vehicular secured communication system determines if data received at an interface disposed at the vehicle is valid by (i) determining correspondence of a first parameter received via the communication network from a first electronic control unit of the plurality of electronic control units with a second parameter received via the communication network from a second electronic control unit of the plurality of electronic control units, (ii) determining correspondence of the first and second parameters with a current vehicle operating parameter or driving condition or driver profile, and (iii) comparing a vehicle behavior indicated by the received data to the current vehicle operating parameter or driving condition or driver profile.

36 Claims, 3 Drawing Sheets

Related U.S. Application Data continuation of application No. 15/586,603, filed on May 4, 2017, now Pat. No. 10,574,305.

(60) Provisional application No. 62/334,504, filed on May 11, 2016.

(51) Int. Cl.
  *H04L 12/40* (2006.01)
  *H04W 4/40* (2018.01)
  *H04W 84/18* (2009.01)

(52) U.S. Cl.
  CPC ........... *H04L 63/1408* (2013.01); *H04W 4/40* (2018.02); *H04L 2012/40215* (2013.01); *H04L 2012/40273* (2013.01); *H04W 84/18* (2013.01)

(56) References Cited

U.S. PATENT DOCUMENTS

| | | | |
|---|---|---|---|
| 5,949,331 | A | 9/1999 | Schofield et al. |
| 6,690,268 | B2 | 2/2004 | Schofield et al. |
| 6,693,517 | B2 | 2/2004 | McCarthy et al. |
| 7,580,795 | B2 | 8/2009 | McCarthy et al. |
| 8,316,605 | B2 | 11/2012 | Oberg |
| 8,527,146 | B1 * | 9/2013 | Jackson ............ B60W 50/0098 |
| | | | 180/287 |
| 9,705,678 | B1 * | 7/2017 | Wang ................... G06F 21/602 |
| 9,731,717 | B2 * | 8/2017 | Kim .................... B60W 40/114 |
| 10,574,305 | B2 * | 2/2020 | Lu ........................... H04W 4/40 |
| 11,043,990 | B2 * | 6/2021 | Lu ...................... H04L 63/1408 |
| 2002/0121981 | A1 * | 9/2002 | Munch ................. G08B 21/06 |
| | | | 340/576 |
| 2004/0083053 | A1 * | 4/2004 | Ohno ..................... G01C 21/26 |
| | | | 340/995.18 |
| 2006/0259231 | A1 * | 11/2006 | Ichikawa ............ G05B 19/4148 |
| | | | 701/115 |
| 2009/0062979 | A1 * | 3/2009 | Sakane .................. B60W 50/04 |
| | | | 701/48 |
| 2012/0062743 | A1 | 3/2012 | Lynam et al. |
| 2012/0105637 | A1 | 5/2012 | Yousefi et al. |
| 2012/0191313 | A1 * | 7/2012 | Miyahara ............ B60W 50/087 |
| | | | 701/70 |
| 2012/0218412 | A1 | 8/2012 | Dellantoni et al. |
| 2013/0073112 | A1 * | 3/2013 | Phelan ................ B60W 40/107 |
| | | | 701/1 |
| 2013/0222592 | A1 | 8/2013 | Gieseke |
| 2013/0261942 | A1 * | 10/2013 | McQuade ............... F02D 41/26 |
| | | | 701/115 |
| 2014/0136397 | A1 * | 5/2014 | Morgan ................. G06Q 40/03 |
| | | | 705/38 |
| 2014/0218529 | A1 | 8/2014 | Mahmoud et al. |
| 2014/0375476 | A1 | 12/2014 | Johnson et al. |
| 2015/0089236 | A1 * | 3/2015 | Han ....................... H04L 9/3271 |
| | | | 713/168 |
| 2015/0099475 | A1 * | 4/2015 | Suzuki ................... H04B 15/00 |
| | | | 455/79 |
| 2015/0113638 | A1 * | 4/2015 | Valasek ................. G06F 21/562 |
| | | | 726/22 |
| 2015/0124096 | A1 | 5/2015 | Koravadi |
| 2015/0158499 | A1 | 6/2015 | Koravadi |
| 2015/0191178 | A1 * | 7/2015 | Roy ........................ H04W 4/48 |
| | | | 701/36 |
| 2015/0251599 | A1 | 9/2015 | Koravadi |
| 2015/0352953 | A1 | 12/2015 | Koravadi |
| 2016/0036917 | A1 | 2/2016 | Koravadi et al. |
| 2016/0210853 | A1 | 7/2016 | Koravadi |
| 2016/0351051 | A1 | 12/2016 | Murthy et al. |
| 2017/0028913 | A1 * | 2/2017 | Bijlani ................... B60K 35/23 |
| 2017/0110022 | A1 | 4/2017 | Gulash |
| 2017/0330067 | A1 | 11/2017 | Lu |

\* cited by examiner

VEHICULAR SECURED COMMUNICATION SYSTEM

CROSS REFERENCE TO RELATED APPLICATIONS

The present application is a continuation of U.S. patent application Ser. No. 16/798,768, filed Feb. 24, 2020, now U.S. Pat. No. 11,043,990, which is a continuation of U.S. patent application Ser. No. 15/586,603, filed May 4, 2017, now U.S. Pat. No. 10,574,305, which claims the filing benefits of U.S. provisional application Ser. No. 62/334,504, filed May 11, 2016, which is hereby incorporated herein by reference in its entirety.

FIELD OF THE INVENTION

The present invention relates generally to a system for a vehicle that communicates data, such as for a driver assistance system of the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Image data captured by the cameras (and other data) can be communicated to a control of the vehicle via a vehicle wire or cable or via a vehicle communication network.

SUMMARY OF THE INVENTION

The present invention provides a driving assistance system or secured communication system for a vehicle that processes multiple electronic control units or modules and that processes information or control commands communicated to the control units to determine if the communication information or command is legitimate or uncorrupted. The data or other message is communicated over a communication network or bus of the vehicle, wherein the communicated data or message is filtered to determine if the message or data is legitimate.

Optionally, the system may utilize multiple antenna for communication via a vehicle to infrastructure (V2X) communication system. The system processes the antenna signals to provide enhanced communications.

These and other objects, advantages, purposes and features of the present invention will become apparent upon review of the following specification in conjunction with the drawings.

DESCRIPTION OF THE PREFERRED EMBODIMENTS

Figure 1:
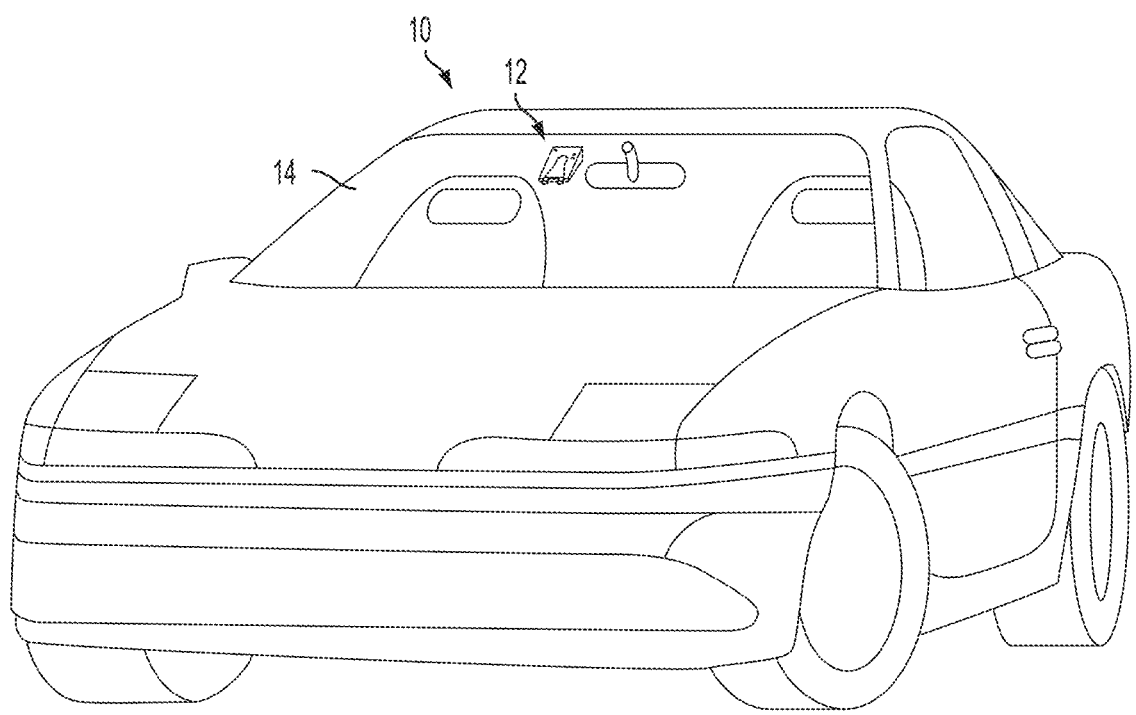
FIG. 1 is a plan view of a vehicle with a vision system that incorporates at least one camera or sensor in accordance with the present invention.

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an imaging system or vision system 12 that includes at least one exterior facing imaging sensor or camera, such as a forward viewing camera disposed at and behind a windshield 14 of the vehicle and viewing through the windshield and forward of the vehicle, such as for capturing image data for use with a driver assistance system of the vehicle, such as a headlamp control system, collision avoidance system, object detection system, traffic sign recognition system, lane departure warning system and/or the like. Optionally the vision system may include other cameras, such as a rearward facing imaging sensor or camera at the rear of the vehicle, a forward facing camera at the front of the vehicle, and a sideward/rearward facing camera at respective sides of the vehicle, which capture images exterior of the vehicle. The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
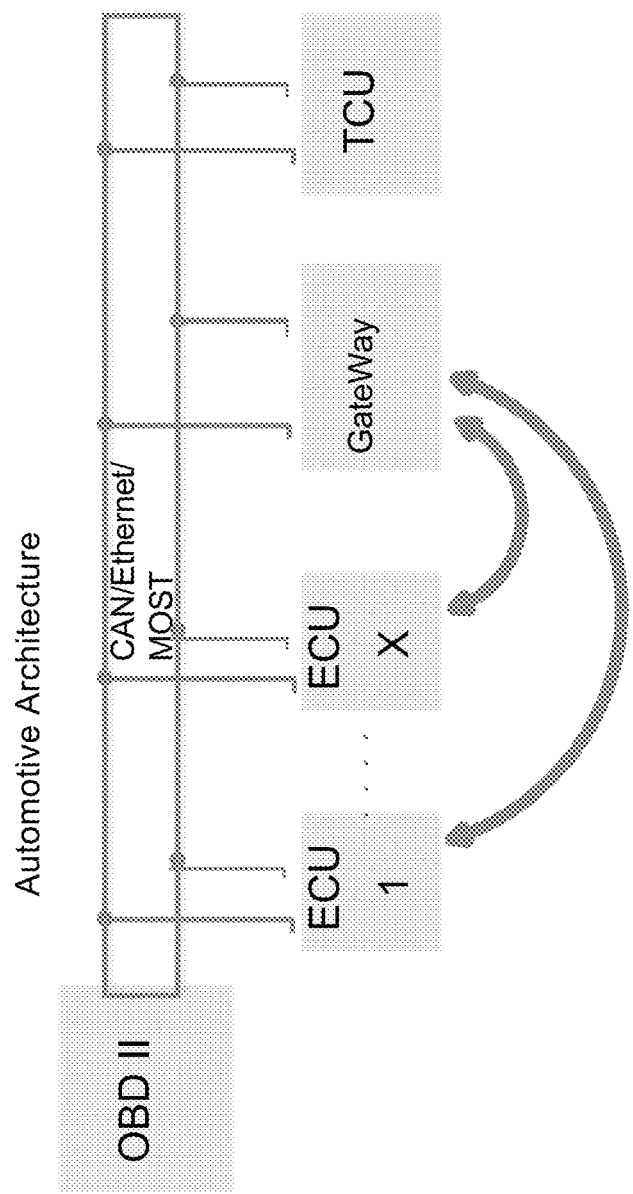
FIG. 2 is a schematic of an automotive communication architecture for a secured communication system of the present invention.

CAN messages are either non-encrypted such as typical BCM (body control module) commands or encrypted such as ECM (engine control module) or TCM (transmission control module), regardless of the baud rate/data rate. Typically, the messages are broadcast throughout the bus network with different module identifiers or IDs. For example, and such as shown in FIG. 2, an interface (which may comprise one of an on board diagnostic (OBD) unit or system or a wireless receiver) may receive data from exterior of the vehicle and may communicate information or command signals or the like with multiple electronic control units (ECUs) of the vehicle. The messages can only be accepted by a module if the ID matches with the destined module ID, otherwise the messages are discarded. Some automotive cybersecurity companies (such as Argus and Towersec) can examine in real-time the CAN messages and determine if the message may be legitimate or not, typically by looking at the header file (to determine if the module ID is legitimate) and the CRC (cyclic redundant code, to determine if the message has been manipulated).

However, a CAN message can appear to be legitimate but may happen at the wrong time that could be duplicated by another (Argus-like) module. An example of that could be when a vehicle is traveling at 30 mph in third gear, the ECM receives a signal to redline all suddenly or fast-gradually. Such a message could be legitimate or it could be maliciously generated from an outside source.

The present invention provides a system or filtering process that can determine whether such messages are legitimate or malicious by utilizing a two-step filtering process:

1. Examine all the modules involved in this command—do all the parameters match as one system? The system of the present invention examines all of the CAN messages related to the command in real-time and this involves multiple ECUs (electronic control units) working together.
2. Compare this behavior with the average driver profile (database, among many drivers) or the particular individual driver's profile through adaptive learning, or both. This will include the previous command history (set for certain time, rolling) and predicative behavior trend.

The process of the present invention can be carried out by individual ECMs locally, or by the security gateway or both with distributed task loads. The result will be an accepted command or rejected command by the ECU and may be recorded for analysis.

The communicated information may pertain to a driving characteristic (such as driving 30 mph in third gear), and the processor compares the indicated driving characteristic to an average driver profile or to the particular individual driver's profile to determine if the driving characteristic of the communicated information is likely legitimate for that driver. For example, if the current driver never drives 30 mph in third gear, the system may determine that the communication may be invalid.

The system thus filters communicated information to determine if the information being communicated makes sense for the particular driving situation and/or particular driver of the vehicle. The system may utilize a two-step filtering process that comprises (i) examining multiple electronic control units involved in the communicated information to determine if parameters of the control units correspond with one another and with the current operating conditions (in other words, are the control units currently operating in a common manner in association with the present operating situation) and (ii) comparing the behavior indicated by the communicated information to a profile typical for a typical driver (or a particular driver) of the vehicle (in other words, does the communicated information or command make sense for the systems in the current operating situation and for the current or typical driver).

For example, when the vehicle is traveling under cruise control on a highway, and absent a control command from an adaptive cruise control (ACC) system of the vehicle, and/or absent intervention by the driver of the equipped vehicle, such as by pressing the brake pedal or deactivating the adaptive cruise control system, and/or absent a control signal from an automatic emergency braking system of the vehicle, the vehicle should not suddenly stop or swerve or accelerate or decelerate, and thus the steering systems and engine control and braking control should operate together to drive the vehicle along the road at the selected or determined speed. If, under these conditions, the system determines that the communicated information is providing commands to stop or swerve or accelerate or decelerate the vehicle (which contradicts the status/parameters of the systems and contradicts the current operating conditions), then the system determines that the communicated information is corrupt or invalid or erroneous or malicious.

Therefore, the present invention provides a secured communication system for a vehicle that includes a plurality of electronic control units disposed at the vehicle, with an interface of the vehicle configured to receive data from exterior of the vehicle for communication to one or more of the electronic control units. The interface comprises one of an on board diagnostic unit or a wireless receiver. A communication network of the vehicle is in communication with the interface and the plurality of electronic control units, and the communication network communicates information from the interface to one or more of the electronic control units. A processor is operable to process information communicated by the communication network. The processor filters the communicated information to determine if the communicated information is uncorrupted.

For example, the processor may identify which electronic control units or modules or processors are associated with the communicated information or command signal. The processor processes the communication information and may filter the communicated information by utilizing a two-step filtering process comprising (i) examining multiple electronic control units involved with the communicated information to determine if parameters of the involved electronic control units correspond with one another and with the current operating conditions of the vehicle, and (ii) comparing the behavior indicated by the communicated information to a profile typical for the driver of the vehicle or the current operating conditions of the vehicle. In other words, the processor may determine which electronic control units are supposed to receive the communicated information or command and may then check those electronic control units to make sure they are operating appropriately relative to one another and relative to the current vehicle operating conditions. The processor then may process the command signal or communicated information for those electronic control units to make sure it is appropriate for the driver profile or current operating conditions of the vehicle. If the electronic control units are operating as expected and if the command signal or communicated information is appropriate for the current operating conditions, then the processor can determine that the information or signal is uncorrupted and can be communicated to the appropriate electronic control units for operation or control of those electronic control units.

The present invention also provides a communication system that is operable to communicate (transmit and receive data or messages) with a vehicle to vehicle (V2V) or vehicle to infrastructure (V2X) communication system. The system may utilize multiple antennae to transmit and receive information. MIMO (multiple-in-multiple-out) antenna technology has been used in consumer WiFi applications extensively within the past decade or so, such as 802.11n and 802.11ac standards.

Figure 3:
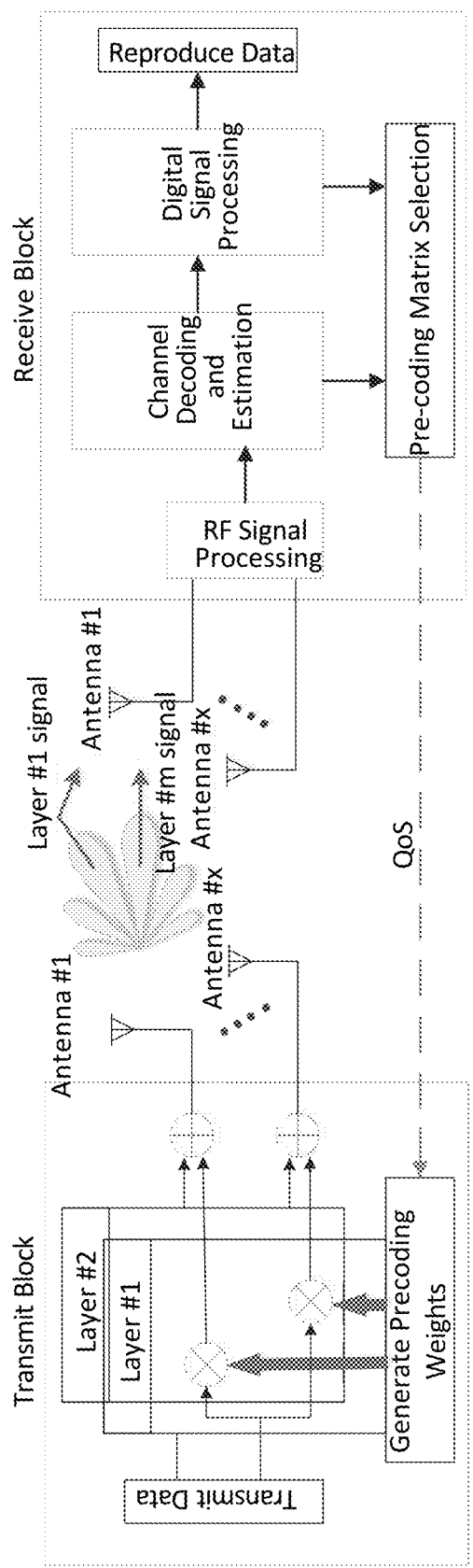
FIG. 3 is a schematic of a multiple input/multiple output system of the present invention.

The process or system or method of the present invention includes multiple antennae ports on both the transmitter and receiver sides (see FIG. 3). The number of antennae from any two modules do not need to match. During transmission, the current transmitted data from module A is encoded based on the received information which are processed previous set of transmitted data (from module A) received by other modules (module B or others). The encoding process will generate different weights for different antennae, based on QoS (quality of signal) and the received analyzed data from other receivers. The potential benefits include better antenna reception, which will translate into further communication distances and more stable communications.

The system thus may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2016-0210853; US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, which are hereby incorporated herein by reference in their entireties.

The system or systems of the present invention may utilize one or more cameras or sensors. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular secured communication system, the vehicular secured communication system comprising:
   a receiver of a vehicle configured to wirelessly receive data from exterior of the vehicle;
   a plurality of electronic control units disposed at the vehicle equipped with the vehicular secured communication system, wherein the plurality of electronic control units are interconnected by a communication network of the vehicle;
   an interface disposed at the vehicle;
   wherein the vehicular secured communication system receives, via the receiver, a communication message;
   wherein the vehicular secured communication system identifies a first electronic control unit and a second electronic control unit from the plurality of electronic control units associated with the communication message; and
   wherein the vehicular secured communication system, responsive to identifying the first electronic control unit and the second electronic control unit, determines if data received at the interface is valid by (i) determining operation of the first electronic control unit relative to operation of the second electronic control unit based on correspondence of a first parameter received via the communication network from the first electronic control unit of the plurality of electronic control units with a second parameter received via the communication network from the second electronic control unit of the plurality of electronic control units, (ii) determining correspondence of the first and second parameters with a current operating parameter of the vehicle, and (iii) comparing a vehicle behavior indicated by the received data to (a) the current operating parameter of the vehicle and (b) a driver profile associated with a current driver of the vehicle.

2. The vehicular secured communication system of claim 1, wherein, responsive to determining that the received data is valid, the vehicular secured communication system accepts the received data.

3. The vehicular secured communication system of claim 2, wherein, responsive to determining that the vehicle behavior indicated by the received data contradicts the current operating parameter of the vehicle, the vehicular secured communication system rejects the received data.

4. The vehicular secured communication system of claim 2, wherein the received data comprises an instruction to change the current operating parameter of the vehicle, and wherein the vehicular secured communication system rejects the instruction responsive to determining that the instruction contradicts the current operating parameter of the vehicle.

5. The vehicular secured communication system of claim 3, wherein the current operating parameter comprises operation of an adaptive cruise control system of the vehicle, and wherein the first and second parameters comprise a steering parameter and an engine control parameter that maneuver the vehicle along a road, and wherein the vehicle behavior indicated by the received data comprises stopping the vehicle or swerving the vehicle.

6. The vehicular secured communication system of claim 1, wherein the vehicular secured communication system determines which electronic control units of the plurality of electronic control units are involved with the received data by determining an identification of the received data that corresponds with two or more of the electronic control units.

7. The vehicular secured communication system of claim 1, wherein the communication network comprises a controller area network (CAN) bus of the vehicle.

8. The vehicular secured communication system of claim 1, wherein the vehicular secured communication system processes the received data in real-time.

9. The vehicular secured communication system of claim 8, wherein the vehicular secured communication system processes the received data via multiple electronic control units.

10. The vehicular secured communication system of claim 1, wherein the vehicular secured communication system wirelessly communicates with at least one selected from a group consisting of (i) a system of another vehicle and (ii) a system of an infrastructure.

11. The vehicular secured communication system of claim 10, wherein the vehicular secured communication system comprises multiple transmitting antennae and multiple receiving antennae.

12. The vehicular secured communication system of claim 11, wherein, during transmission by the multiple transmitting antennae, transmitted data is encoded based on the data received by the multiple receiving antennae.

13. The vehicular secured communication system of claim 12, wherein the transmitted data is encoded via a process that generates different weights for different receiving antennae based on quality of signal and the data received by the multiple receiving antennae.

14. The vehicular secured communication system of claim 1, wherein the vehicular secured communication system processes the received data to determine if the received data is malicious.

15. The vehicular secured communication system of claim 1, wherein the interface comprises an on board diagnostic unit.

16. The vehicular secured communication system of claim 1, wherein the interface comprises the receiver.

17. A vehicular secured communication system, the vehicular secured communication system comprising:
   a receiver of a vehicle configured to wirelessly receive data from exterior of the vehicle;
   a plurality of electronic control units disposed at the vehicle equipped with the vehicular secured communication system, wherein the plurality of electronic control units are interconnected by a communication network of the vehicle;
   an interface disposed at the vehicle configured to wirelessly receive data from exterior of the vehicle;
   wherein the vehicular secured communication system receives, via the receiver, a communication message;
   wherein the vehicular secured communication system identifies a first electronic control unit and a second electronic control unit from the plurality of electronic control units associated with the communication message;
   wherein the communication network comprises a controller area network (CAN) bus of the vehicle; and
   wherein the vehicular secured communication system, responsive to identifying the first electronic control unit and the second electronic control unit, determines if data received at the interface is valid by (i) determining operation of the first electronic control unit relative to operation of the second electronic control unit based on correspondence of a first parameter received via the communication network from the first electronic control unit of the plurality of electronic control units with a second parameter received via the communication network from the second electronic control unit of the plurality of electronic control units, (ii) determining correspondence of the first and second parameters with a current driving condition of the vehicle, and (iii) comparing a vehicle behavior indicated by the received data to (a) the current driving condition of the vehicle and (b) a driver profile associated with a current driver of the vehicle.

18. The vehicular secured communication system of claim 17, wherein, responsive to determining that the received data is valid, the vehicular secured communication system accepts the received data.

19. The vehicular secured communication system of claim 18, wherein, responsive to determining that the vehicle behavior indicated by the received data contradicts the current driving condition of the vehicle, the vehicular secured communication system rejects the received data.

20. The vehicular secured communication system of claim 17, wherein the vehicular secured communication system processes the received data in real-time.

21. The vehicular secured communication system of claim 20, wherein the vehicular secured communication system processes the received data via multiple electronic control units.

22. The vehicular secured communication system of claim 17, wherein the vehicular secured communication system wirelessly communicates with at least one selected from a group consisting of (i) a system of another vehicle and (ii) a system of an infrastructure.

23. The vehicular secured communication system of claim 17, wherein the vehicular secured communication system processes the received data to determine if the received data is malicious.

24. The vehicular secured communication system of claim 17, wherein the interface comprises an on board diagnostic unit.

25. The vehicular secured communication system of claim 17, wherein the interface comprises the receiver.

26. A vehicular secured communication system, the vehicular secured communication system comprising:
a receiver of a vehicle configured to wirelessly receive data from exterior of the vehicle;
a plurality of electronic control units disposed at the vehicle equipped with the vehicular secured communication system, wherein the plurality of electronic control units are interconnected by a communication network of the vehicle;
an interface disposed at the vehicle;
wherein the vehicular secured communication system receives, via the receiver, a communication message;
wherein the vehicular secured communication system identifies a first electronic control unit and a second electronic control unit from the plurality of electronic control units associated with the communication message;
wherein the communication network comprises a controller area network (CAN) bus of the vehicle; and
wherein the vehicular secured communication system, responsive to identifying the first electronic control unit and the second electronic control unit, determines if data received at the interface is valid by (i) determining operation of the first electronic control unit relative to operation of the second electronic control unit based on correspondence of a first parameter received via the communication network from the first electronic control unit of the plurality of electronic control units with a second parameter received via the communication network from the second electronic control unit of the plurality of electronic control units, (ii) determining correspondence of the first and second parameters with a driver profile of a driver of the vehicle, and (iii) comparing a vehicle behavior indicated by the received data to the driver profile.

27. The vehicular secured communication system of claim 26, wherein the vehicular secured communication system compares the vehicle behavior indicated by the received data to an average driver profile that is indicative of an average driver driving the vehicle.

28. The vehicular secured communication system of claim 26, wherein the vehicular secured communication system compares the vehicle behavior indicated by the received data to the driver profile of the particular driver of the vehicle to determine if the vehicle behavior indicated by the received data is legitimate for the particular driver of the vehicle.

29. The vehicular secured communication system of claim 26, wherein, responsive to determining that the received data is valid, the vehicular secured communication system accepts the received data.

30. The vehicular secured communication system of claim 29, wherein, responsive to determining that the vehicle behavior indicated by the received data contradicts the driver profile, the vehicular secured communication system rejects the received data.

31. The vehicular secured communication system of claim 26, wherein the vehicular secured communication system processes the received data in real-time.

32. The vehicular secured communication system of claim 31, wherein the vehicular secured communication system processes the received data via multiple electronic control units.

33. The vehicular secured communication system of claim 26, wherein the vehicular secured communication system wirelessly communicates with at least one selected from a group consisting of (i) a system of another vehicle and (ii) a system of an infrastructure.

34. The vehicular secured communication system of claim 26, wherein the vehicular secured communication system processes the received data to determine if the received data is malicious.

35. The vehicular secured communication system of claim 26, wherein the interface comprises an on board diagnostic unit.

36. The vehicular secured communication system of claim 26, wherein the interface comprises the receiver.

* * * * *